United States Patent [19]

Ayliffe et al.

[11] Patent Number: 4,728,947

[45] Date of Patent: Mar. 1, 1988

[54] ADDRESSING LIQUID CRYSTAL CELLS USING BIPOLAR DATA STROBE PULSES

[75] Inventors: Peter J. Ayliffe, Stansted; Anthony B. Davey, Stortford; Johannes K. Zelisse, Cambridge, all of England

[73] Assignee: STC plc, London, England

[21] Appl. No.: 847,331

[22] Filed: Apr. 2, 1986

Related U.S. Application Data

[63] Continuation-in-part of Ser. No. 782,796, Oct. 2, 1985, and a continuation-in-part of Ser. No. 647,567, Sep. 6, 1984.

[30] Foreign Application Priority Data

Apr. 3, 1985 [GB] United Kingdom ................. 8508713

[51] Int. Cl.[4] .......................... G09G 3/36; G06F 3/14

[52] U.S. Cl. ..................................... 340/805; 340/784

[58] Field of Search ................................ 340/805, 784

[56] References Cited

U.S. PATENT DOCUMENTS

| | | | |
|---|---|---|---|
| 3,776,615 | 12/1973 | Tsukamoto et al. . | |
| 3,835,463 | 9/1974 | Tsukamoto et al. . | |
| 3,911,421 | 10/1975 | Alt et al. . | |
| 3,973,252 | 8/1976 | Mitomo et al. . | |
| 3,995,942 | 12/1976 | Kawakami et al. . | |
| 4,040,720 | 8/1977 | York . | |
| 4,048,633 | 9/1977 | Sano | 340/784 |
| 4,060,801 | 11/1977 | Stein et al. . | |
| 4,082,430 | 4/1978 | Schulthess et al. . | |
| 4,100,540 | 7/1978 | Fujita et al. . | |
| 4,117,472 | 9/1978 | Freer et al. | 340/805 |
| 4,180,813 | 12/1979 | Yoneda . | |
| 4,187,505 | 2/1980 | Morley et al. . | |
| 4,206,459 | 6/1980 | Houryu et al. . | |
| 4,372,871 | 2/1983 | Toriyama et al. . | |
| 4,404,555 | 9/1983 | Long et al. . | |
| 4,408,201 | 10/1983 | Harada | 340/784 |
| 4,427,978 | 1/1984 | Williams . | |
| 4,443,062 | 4/1984 | Togashi et al. . | |
| 4,511,926 | 4/1985 | Crossland et al. . | |
| 4,571,585 | 2/1986 | Stein et al. . | |
| 4,638,310 | 1/1987 | Ayliffe | 340/784 |

FOREIGN PATENT DOCUMENTS 0091661 7/1983 European Pat. Off. .

*Primary Examiner*—Howard A. Birmiel
*Attorney, Agent, or Firm*—Lee, Smith & Zickert

[57] ABSTRACT

A method of addressing a matrix addressed ferroelectric liquid crystal cell is described that uses parallel entry of balanced bipolar data pulses on one set of electrodes to co-operate with serial entry of unipolar strobe pulses on the other set of electrodes. Data entry is preceded with blanking (erasing) pulses applied to the strobe lines. The polarity of the strobing and blanking pulses is periodically reversed to maintain charge balance in the long term.

12 Claims, 18 Drawing Figures

180
+V
0
-V
t
to2
STROBE row'p'
180
STROBE row'p+1'
181a
181b
DATA col.q
to1
to3
to1+to3
DATA col.r
(p,q)
(p,r)
(p+1,q)
(p+1,r)

ADDRESSING LIQUID CRYSTAL CELLS USING BIPOLAR DATA STROBE PULSES

TECHNICAL FIELD

This invention relates to the addressing of liquid crystal cells and more particularly to the use of electrical pulses to address matrix arrays of ferroelectric liquid crystal cells.

CROSS-REFERENCE TO RELATED APPLICATIONS

This application is deemed to be a continuation in part of those previously filed, commonly assigned, copending U.S. patent applications specifically referenced in the "Backgrond Art" and "Detailed Description" sections of the present application, namely, US patent application Ser. No. 782,796 filed on Oct. 2, 1985 (W. A. Crossland et al: "Ferroelectric Liquid Crystal Display Cells") which is based on and claims priority from British Patent Application No. 8426976 filed on Oct. 25, 1984 and U. S. application Ser. No. 647,567 filed on Sept. 6, 1984 (P. J. Ayliffe: "Method of Addressing Liquid Crystal Displays") which is based on and claims priority from U K Patent Specification No. 8324304 filed on Sept. 10, 1983 (now U K Pat. No. 2146473A).

In addition the subject matter of this application may relate to commonly assigned U.S. patent applications filed on even date herewith under attorney docket numbers P J Ayliffe et al 12-8 (Rev) and P J Ayliffe et al 14-10 (Rev), which are respectively entitled "Addressing Liquid Crystal Cells Using Unipolar Strobe Pulses" and "Addressing Liquid Crystal Cells Using Asymmetric Data Pulses" and which respectively claim priority from U K Patent Specification No. 8508712 filed on Apr. 3, 1985, and from U K Patent Spefication No. 8508709 filed on Apr. 3, 1985.

To the extent the teachings of any of these related applications may be useful in the understanding and use of the present invention, they are hereby incorporated by reference.

Furthermore, Applications hereby affirm that, to the extent that the inventive entity for any of the claimed subject matter in any of the above-enumerated U.S. patent applications may differ from that for any invention claimed herein, both such inventive entities were under a legal obligation at the time their respective inventions were made to assign all rights in such inventions to a common assignee.

BACKGROUND ART

In addition to dynamic scattering mode liquid crystal devices operated using a d.c. drive or an a.c. one, the prior art also includes field effect mode liquid crystal devices which have generally been operated using an a.c. drive in order to avoid performance impairment problems associated with electrolytic degradation of the liquid crystal layer and which have employed liquid crystals that interacts with an applied electric field by way of an induced dipole. As a result such field effect devices are not sensitive to the polarity of the applied field, but respond to the applied RMS voltage averaged over approximately one response time at that voltage. There may also be frequency dependence as in the case of so-called two-frequency materials, but this only affects the type of response produced by the applied field.

In contrast, a ferroelectric liquid crystal exhibits a permanent electric dipole, and it is this permanent dipole which will interact with an applied electric field. Ferroelectric liquid crystals are of potential interest in display, switching and information processing applications because they are expected to show a greater coupling with an applied field than that typical of a liquid crystal that relies on coupling with an induced dipole, and hence ferroelectric liquid crystals are expected to show a faster response. A ferroelectric liquid crystal display mode is described for instance by N. A. Clark et al in a paper entitled 'Ferro-electric Liquid Crystal Electro-Optics Using the Surface Stabilized Structure' appearing in Mol. Cryst. Liq. Cryst. 1983 Volume 94 pages 213 to 234. By way of example reference may also be made to an alternative mode that is described in commonly assigned U.S. patent application Ser. No. 782,796, W. A. Crossland et al "Ferroelectric Liquid Crystal Display Cells" which is based on and claims priority from British Patent Application No. 8426976. To the extent the teachings of any of these related publications and applications may be useful in the understanding and use of the present invention, they are hereby incorporated by reference.

DISCLOSURE OF INVENTION

In order to fully appreciate the advantages of the present invention, it should be understood that a particularly significant characteristic peculiar to ferroelectric smectic cells is the fact that they, unlike other types of liquid crystal cells, are responsive differently according to the polarity of the applied field. This characteristic sets the choice of a suitable matrix-addressed driving system for a ferroelectric smectic into a class of its own. A further factor which can be significant is that, in the region of switching times of the order of a microsecond, a ferroelectric smectic typically exhibits a relatively weak dependence on its switching time upon switching voltage. In this region the switching time of a ferroelectric may typically exhibit a response time proportional to the inverse square of applied voltage or, even worse, proportional to the inverse single power of voltage. In contrast to this, a (non-ferroelectric) smectic A device, which in certain other respects is a comparable device exhibiting a long-term storage capability, exhibits in a corresponding region of switching speeds a response time that is typically proportional to the inverse fifth power of voltage. The significance of this difference becomes apparent when it is appreciated first that there is a voltage threshold beneath which a signal will never produce switching however long that signal is maintained; second that for any chosen voltage level above this voltage threshold there is a minimum time $t_S$ for which the signal has to be maintained to effect switching; and third that at this chosen voltage level there is a shorter minimum time $t_P$ beneath which the application of the signal voltage produces no persistent effect, but above which, upon removal of the signal voltage, the liquid crystal does not revert fully to the state subsisting before the signal was applied. When the relationship $t_S=f(V)$ between V and $t_S$ is known, a working guide to the relationship between V and $t_P$ is often found to be given by the curve $t_P=g(V)$ formed by plotting ($V_1$, $t_2$) where the points ($V_1$, $t_1$ and $V_2$,$t_2$) lie on the $t_S=F(V)$ curve, and where $t_1=10t_2$. Now the ratio of $V_2/V_1$ is increased as the inverse dependence of switching time upon applied voltage weakens. and hence, when the working guide is applicable, a consequence of weakened dependence is an increased intolerance of the system to the incidence of wrong polarity signals to any pixel, that is signals tending to switch to the '1' state a pixel intended to be left in the '0' state, or to switch to the '0' state a pixel intended to be left in the '1' state.

Therefore, a good drive scheme for addressing a ferroelectric liquid crystal cell must take account of polarity, and may also need to take particular care to minimize the incidence of wrong polarity signals to any given pixel whether it is intended as '1' state pixel or a '0' state one. Additionally, the waveforms applied to the individual electrodes by which the pixels are addressed need to be charge-balanced at least in the long term. If the electrodes are not insulated from the liquid crystal this is so as to avoid electrolytic degradation of the liquid crystal brought about by a net flow of direct current through the liquid crystal. On the other hand, if the electrodes are insulated, such charge balancing will serve to prevent a cumulative build up of charge at the interface between the liquid crystal and the insulation. The first method is one of the methods described in commonly assigned co-pending U.S. application Ser. No. 647,567 filed on Sept. 2, 1984 under attorney docket number Ayliffe 8 (Rev) entitled "Method of Addressing Liquid Crystal Displays" and which is based on and claims priority from U K Patent Specification No. 8324304 filed on Sept. 10, 1983 (now U K Pat. No. 2146473A), the teachings of which being hereby incorporated by reference.

With these considerations in mind a number of methods for addressing matrix-array type ferroelectric liquid crystal cells have been disclosed in commonly assigned co-pending U.S. application Ser. No. 647,567 filed on Sept. 6, 1984 under attorney docket number Ayliffe 8 (Rev) entitled "Method of Addressing Liquid Crystal Displays" and which is based on and claims priority from U K Patent Specification No. 8324304 filed on Sept. 10, 1983 (now U K Pat. No. 2146473A), the teachings of which being hereby incorporated by reference. In particular there is an addressing method described with reference to FIG. 2 of that co-pending U.S. application which employs balanced bipolar strobe pulses in conjunction with balanced bipolar data pulses for the addressing of the cell. In that particular addressing method the strobe pulse voltage is switched between $+V_S$ and $-V_S$ and the data pulse voltage is switched between $+V_D$ and $-V_D$. These voltages co-operate to produce a potential difference of $(V_S+V_D)$ across the thickness of the liquid crystal layer of the cell for a duration $t_S$, and it is arranged that this will be sufficient to effect switching of any pixel to which this signal is applied. The shape and timing of the strobe and data pulses is arranged so that at no time will a pixel see a wrong polarity signal having a magnitude exceeding $|V_S-V_D|$, or $|V_D|$, whichever is the greater. By this means is facilitated the achieving of low maximum magnitude of reverse polarity signals, but this is achieved at the expense of a line address time of $4t_S$.

The present invention is concerned with modifying the waveforms with a view to reducing the minimum line address time for a given address voltage, albeit that this is achieved at the expense of an exposure to larger reverse polarity signals. In this context it can be shown that certain configurations of cell with certain mixtures ferroelectric liquid crystal fillings exhibit a switching behaviour that is much more tolerant of reverse polarity voltages than is implied by the above-quoted working guide, for instance producing no persistent effect when addressed with a reverse polarity pulse of the same duration by only 75% of the amplitude of a pulse that is just sufficient to effect switching.

According to the present invention there is provided a method of addressing a matrix-array type liquid crystal cell with a ferroelectric liquid crystal layer whose pixels are defined by the areas of overlap between the members of a first set of electrodes on one side of the liquid crystal layer and the members of a second set on the other side of the layer, wherein the cell is addressed on a line-by-line basis by applying strobe pulses serially to the members of the first set while data pulses are applied in parallel to the members of the second set, wherein the strobe and data pulse waveforms are balanced bipolar pulses, and wherein in the addressing of any given pixel by the co-operative action of a strobe pulse of a data pulse waveform includes a zero voltage step during at least a part of the strobe pulse.

BRIEF DESCRIPTION OF THE DRAWINGS

The description refers to the accompanying drawings in which.

BEST MODE(S) FOR CARRYING OUT THE INVENTION

There follows a description of a ferroelectric liquid crystal cell and of a number of ways by which it may be addressed. With the exception of the first method, which has been included for the purposes of comparison, all these methods embody the present invention in preferred forms. The first method is one of the methods described in the above-referenced commonly assigned co-pending U.S. application Ser. No. 647,567 filed on Sept. 6, 1984 and entitled "Method of Addressing Liquid Crystal Displays".

Figure 1:
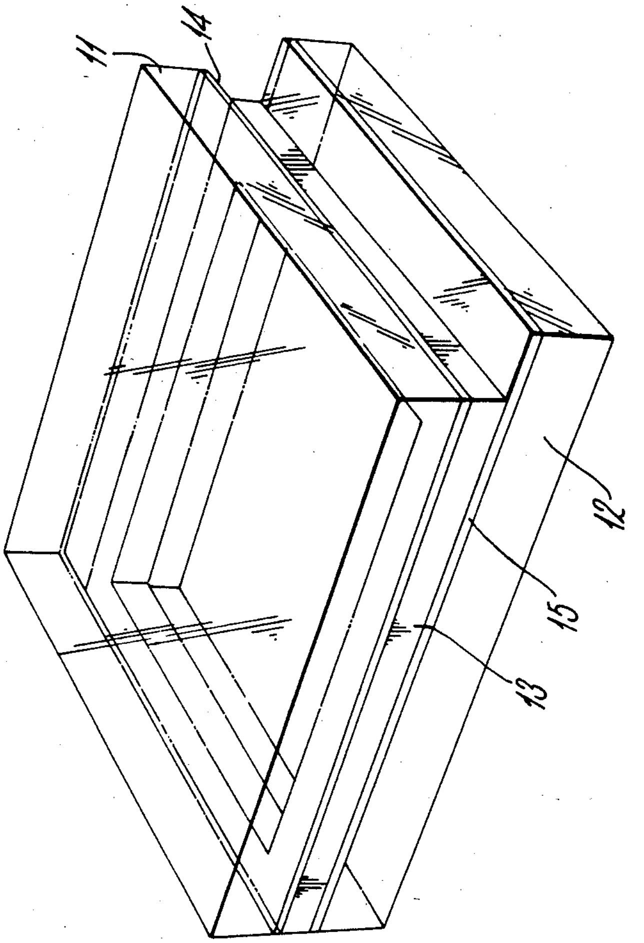
FIG. 1 depicts a schematic perspective view of an exemplary ferroelectric liquid crystal cell.

Referring now to FIG. 1, a hermetically sealed envelope for a liquid crystal layer is formed by securing together two glass sheets 11 and 12 with a perimeter seal 13. The inward facing surfaces of the two sheets carry transparent electrode layers 14 and 15 of indium tin oxide, and each of these electrode layers is covered within the display area defined by the perimeter seal with a polymer layer, such as polyimide (not shown), provided for molecular alignment purposes. Both polyimide layers are rubbed in a single direction so that when a liquid crystal is brought into contact with them they will tend to promote planar alignment of the liquid crystal molecules in the direction of the rubbing. The cell is assembled with the rubbing directions aligned parallel with each other. Before the electrode layers 14 and 15 are covered with the polymer, each one is patterned to define a set of strip electrodes (not shown) that individually extend across the display area and on out to beyond the perimeter seal to provide contact areas to which terminal connection may be made. In the assembled cell the electrode strips of layer 14 extend transversely of those of layer 15 so as to define a pixel at each elemental area where an electrode strip of layer 15 is overlapped by a strip of layer 14. The thickness of the liquid crystal layer contained within the resulting envelope is determined by the thickness of the perimeter seal, and control over the precision of this may be provided by a light scattering of short lengths of glass fiber (not shown) of uniform diameter distributed through the material of the perimeter seal. Conveniently the cell is filled by applying a vacuum to an aperture (not shown) through one of the glass sheets in one corner of the area enclosed by the perimeter seal so as to cause the liquid crystal medium to enter the cell by way of another aperture (not shown) located in the diagonally opposite corner. (Subsequent to the filling operation the two apertures are sealed.) The filling operation is carried out with the filling material heated into its isotropic phase as to reduce its viscosity to a suitably low value. It will be noted that the basic construction of the cell is similar to that of for instance a conventional twisted nematic, except of course for the parallel alignment of the rubbing directions.

Typically the thickness of the perimeter seal 13, and hence of the liquid crystal layer, is about 10 microns, but thinner or thicker layer thicknesses may be required to suit particular applications depending for instance upon whether or not bistability of operation is required and upon whether the layer is to be operated in the $S_C{}^*$ phase or in one of the more ordered phases such as $S_I{}^*$ or $S_F{}^*$.

Some drive schemes for ferroelectric cells are described in the above-referenced commonly assigned co-pending U.S. application Ser. No. 647,567 filed on Sept. 6, 1984 under attorney docket number Ayliffe 8 (Rev). Among these is a scheme that is described with particular reference to FIG. 2 of that co-pending U.S. application, a part of which has been reproduced herein in slightly modified form as FIG. 2. This employs balanced bipolar data pulses 21*a*, 21*b* to co-act with balanced bipolar strobe pulses 20. The strobe pulses 20 are applied serially to the electrode strips of one electrode layer, while the data pulses 21*a*, and 21*b* are applied in parallel to those of the other layer. In this particular scheme a strobe pulse 20 makes an excursion to a voltage $+V_S$ for a duration $t_S$, and then immediately an excursion to a voltage $-V_S$ for a further duration $t_S$. Both types of data pulse 21*a* and 21*b* have a total duration of $4t_S$, starting $t_S$ before the beginning of the positive excursion of a strobe pulse, and ending $t_S$ after the end of its negative-going excursion. A data '1' pulse 21*a* commences by making a positive-going excursion to a voltage $+V_D$ for a duration $t_S$, a negative-going excursion to a voltage $-V_D$ for a duration $2t_S$, and finally a positive-going excursion to $+V_D$ for a duration $t_S$. A data '0' pulse 21*b* is the inverse of the data '1' pulse. It starts with a negative-going excursion to $-V_D$ for a duration $t_S$, follows this with an excursion to $+V_D$ for a duration $2t_S$, and terminates with an excursion back to $-V_D$ for a duration $t_S$.

The potential difference developed across the liquid crystal layer at a pixel addressed by a coincidence of a strobe pulse 20 with a data '1' pulse 21*a* is given by the pulse waveform 22*a*, while that of 22*b* is that which is produced at a pixel addressed by the coincidence of a strobe pulse 20 with a data '0' pulse 21*b*. In each instance the pixel is addressed by a voltage of duration $t_S$ and of magnitude $|V_S+V_D|$ tending to switch the pixel in the required direction, but it is also addressed by two reverse polarity pulses of magnitude $|V_D|$, and one of magnitude $|V_S-V_D|$, tending to switch it in the wrong direction. The values of $V_S$ and $V_D$ are chosen so that the pixel is appropriately switched by the $|V_S+V_D|$ magnitude pulse without this switching being negated by the reverse polarity pulses. In considering the effect of reverse polarity pulses upon a given pixel it should also be noted that the data employed to address the immediately preceding and immediately following lines may be such as to produce a pair of reverse polarity pulses of magnitude $|V_D|$ and net duration $t_S$ that immediately precede and follow the voltage waveform produced by the addressing of the given pixel.

The strobe and data pulse waveforms allow individual pixels to be switched in either direction, that is data entry can be used to drive into the data '1' state selected pixels that were previously in the data '0' state, while at the same time other pixels that were previously in the '1' state are switched into the '0' state. The waveforms are charge balanced. These features are however attained at the expense of a line address time of $4t_S$ even though the switching voltage magnitude $|V_S+V_D|$ is capable of switching a pixel in a quarter of this time.

Figures 3, 4:
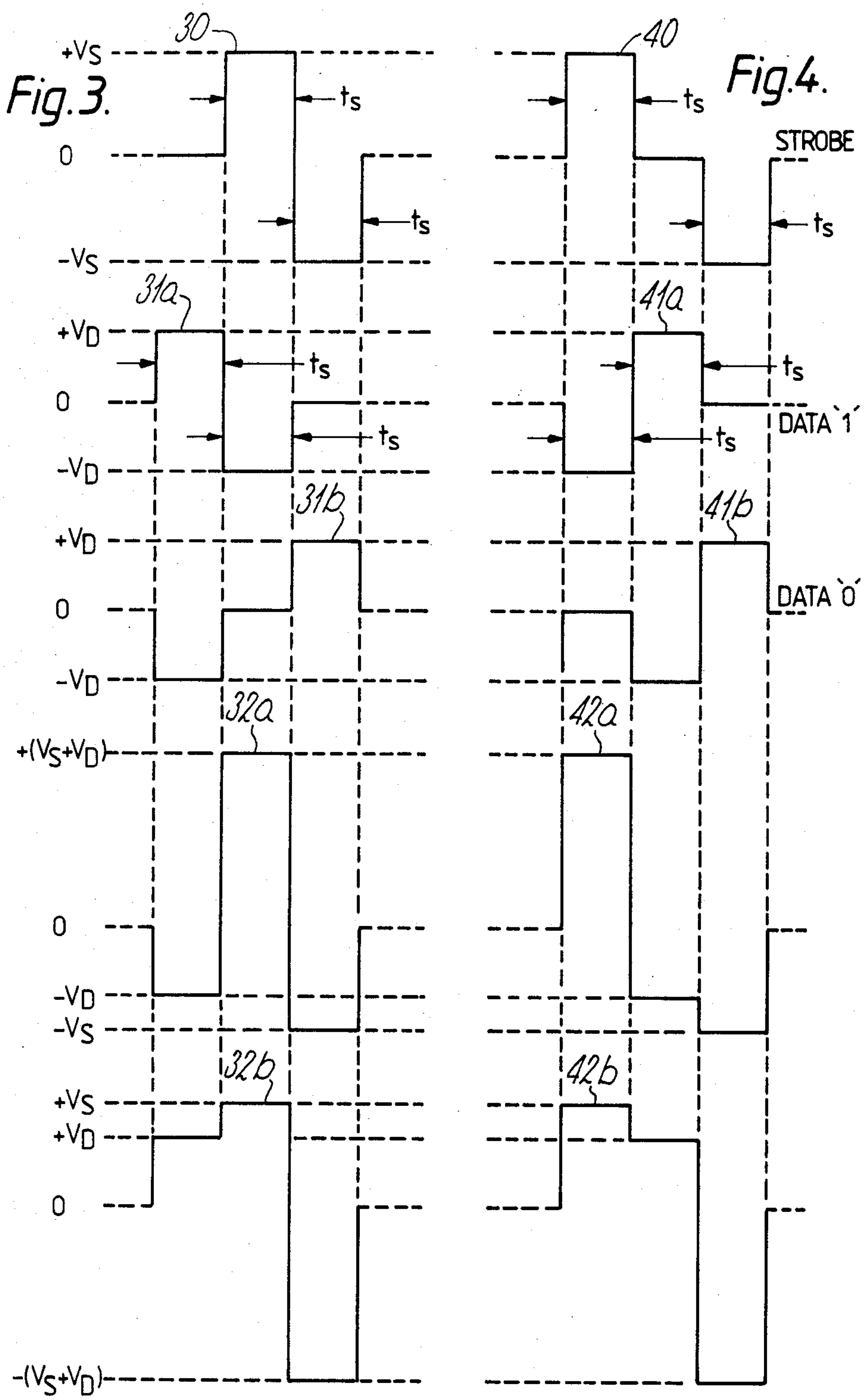

Attention will now be turned to FIG. 3 which depicts waveforms according to one preferred embodiment of the present invention. Strobing, data '1' and data '0' pulse waveforms are depicted respectively at 30, 31*a*, and 31*b*.

As before, the data pulse waveforms are applied in parallel to the electrode strips of one of the electrode layers 14, 15, while the strobe pulses are applied serially to those of the other electrode layer.

A strobe pulse 30 is a balanced bipolar pulse having a negative-going voltage excursion to $-V_S$ following immediately after a positive-going one to $+V_S$, both excursions being of duration $t_S$.

The data pulses 31*a* and 31*b* are balanced bipolar pulses, each having negative-and positive-going excursions of magnitude $|V_D|$ and duration $t_S$. In the case of the data '0' waveform 31*b*, these excursions are separated by a zero voltage portion, also of duration $t_S$; while in the case of the data '1' waveform 31*a*, the negative-going excursion follows on immeiately after the positive-going excursion, and is itself followed by a zero voltage portion of duration $t_S$.

The potential difference developed across the liquid crystal layer at a pixel addressed by the coincidence of a strobe pulse 30 with a data '1' pulse 31*a* is given by the pulse waveform 32*a*, while that of 32*b* is that which is produced at a pixel addressed by the coincidence of a strobe pulse 30 with a data '0' pulse 31*b*. In each instance the pixel is addresed by a voltage of duration $t_S$ and magnitude $|V_S+V_D|$ tending to switch the pixel in the required direction, but it is also addresed by reverse polarity pulses of magnitude $|V_S|$ and $|V_D|$, both of duration $t_S$, tending to switch the pixel in the wrong direction. The values of $V_S$ and $V_D$ are chosen so that the pixel is appropriately switched by the $|V_S+V_D|$ magnitude pulse without this witching being negated by the reverse polarity pulses. In considering the effect of reverse polarity pulses upon a given pixel it should also be noted that the data employed to address the immediately preceding and immediatley following lines may be such as to produce a single additional reverse polarity pulse of magnitude $|V_D|$ and direction $t_S$ that either immediateley precedes or immediately follows the voltage waveform produced by the addressing of the given pixel.

Figure 2:
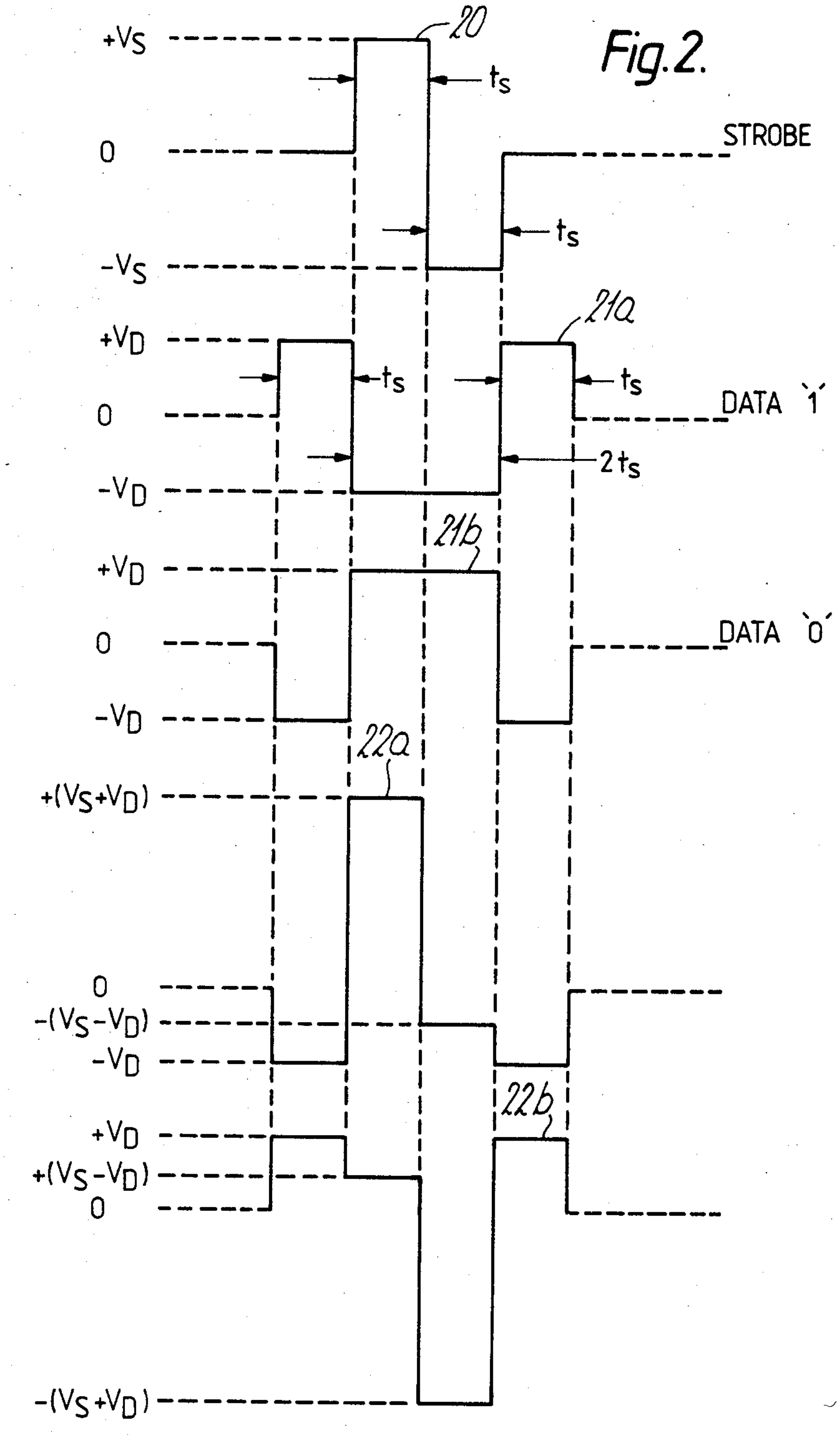
FIG. 2 depicts the waveforms of a previously disclosed drive scheme which may be used to drive the cell of FIG. 1, and FIGS. 3 to 18 depict the waveforms of sixteen alternative drive schemes embodying the invention in preferred forms which may also be used to drive the cell of FIG. 1.

Thus these strobe and data pulse waveforms of FIG. 3 co-operate to provide a shorter line address time than those of FIG. 2, $3t_S$ instead of $4t_S$. This saving of time is obtained at the expense of exposing the pixel to a reverse polarity pulses of magnitude $|V_S|$ and $|V_D|$, whereas with the FIG. 2 waveforms the reverse polarity pulses have magnitudes of $|V_S-V_D|$ and $|V_D|$. The reverse polarity pulse of magnitude $|V_S|$ is more significant than the other whenever $|V_S|>|2V_D|$, a condition which is generally satisfied in practice.

FIG. 4 depicts the waveforms according to an alternative preferred embodiment of the present invention. Strobing data '1' and data '0' pulse waveforms are depicted respectively at 40, 41a and 41b, with the resultant potentials developed across an addressed pixel being given by waveforms 42a and 42b. These waveforms are derivable from those of FIG. 3 by interchange of the roles of the first and second thirds of each waveform. A reason for making this interchange is that under the condition $|V_S|>|2V_D|$ the reverse polarity pulse that immediately precedes exposure of a pixel to $+(V_S+V_D)$, or that immediately follows the exposure of a pixel to $-(V_S+V_D)$ is reduced in magnitude from $|V_S|$ to $|V_D|$.

Figure 5:
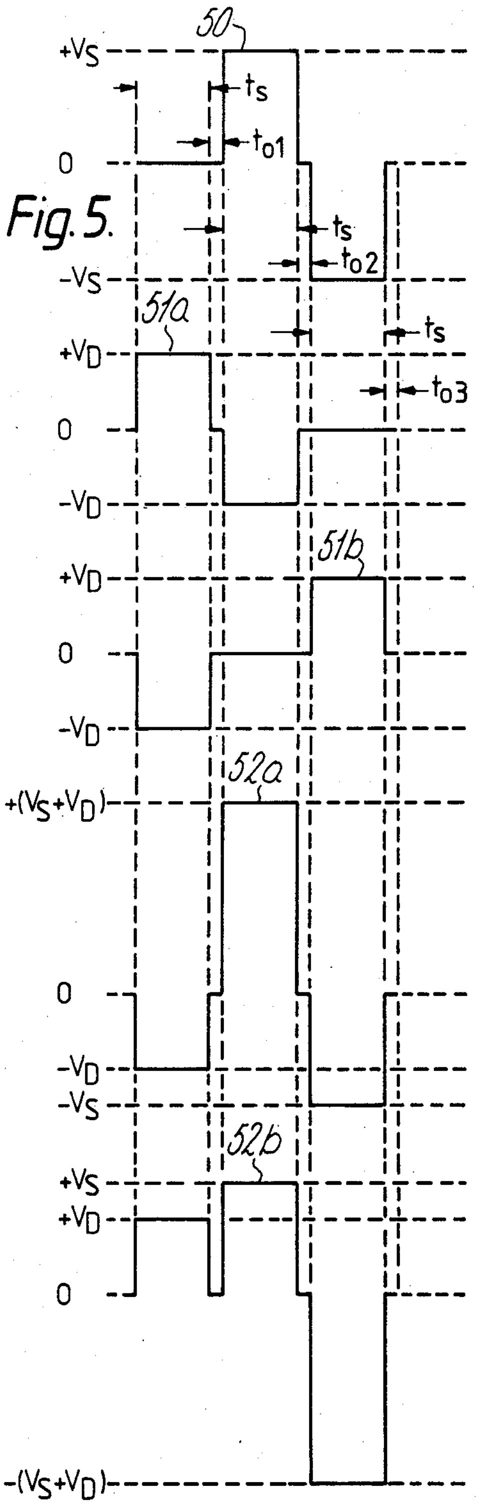
Figure 6:
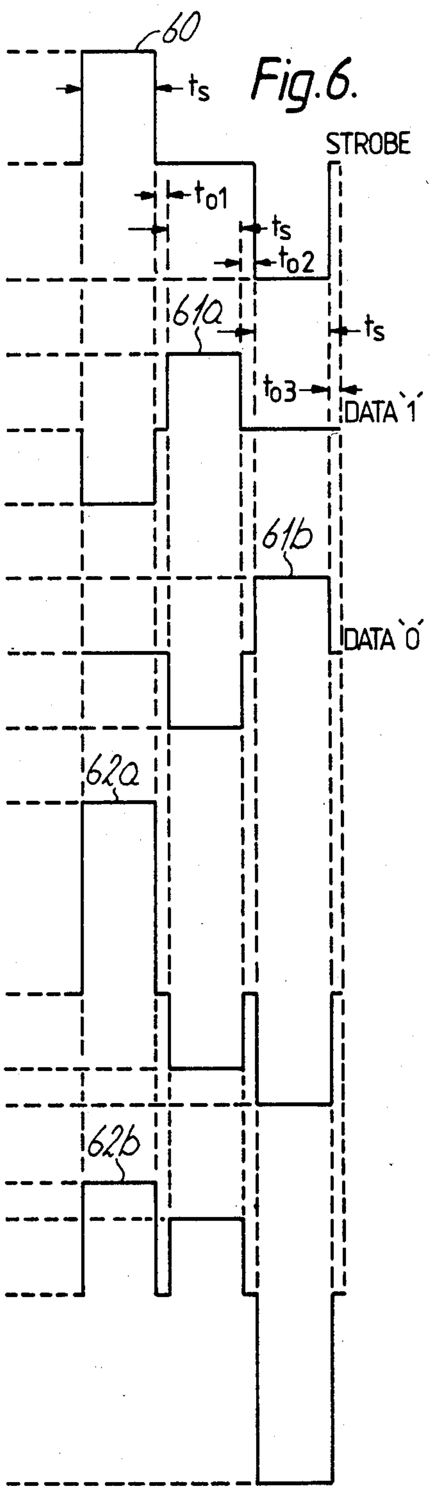

When using either the waveforms of FIG. 3, or those of FIG. 4, the line address time is $3t_S$, the value of which is related to the magnitude of the full switching voltage $|V_S+V_D|$. It has been found however that in some circumstances the minimum conditions for achieving switching are adversely affected if the switching is immediately followed or immediately preceded by a stimulus of the opposite polarity. Inspection of waveforms 32a and 32b reveals for instance that with the FIG. 3 waveforms the switching stimulus is always immediately preceded with a stimulus of the opposite polarity. At least under some conditions the switching criteria can be somewhat relaxed, for instance to allow a shortening of the duration $t_S$ or a reduction of the switching voltage $(V_S+V_D)$. This may be achieved by introducing zero voltage steps of duration $t_{01}$, $t_{02}$ and $t_{03}$ between each consecutive third of the waveforms of FIGS. 3 and 4 to produce waveforms as depicted in FIGS. 5 and 6. In these Figures the strobe pulse waveforms are depicted respectively at 50 and 60, the data '1' waveforms respectively at 51a and 61a, the data '0' waveforms respectively at 51b and 61b, and the resultant potentials developed across an addressed pixel at 52a, 52b, 62a and 62b. Typically the duration of each of the zero voltage steps $t_{01}$, $t_{02}$ and $t_{03}$ is approximately 60% of the duration $t_S$.

Figures 7, 8:
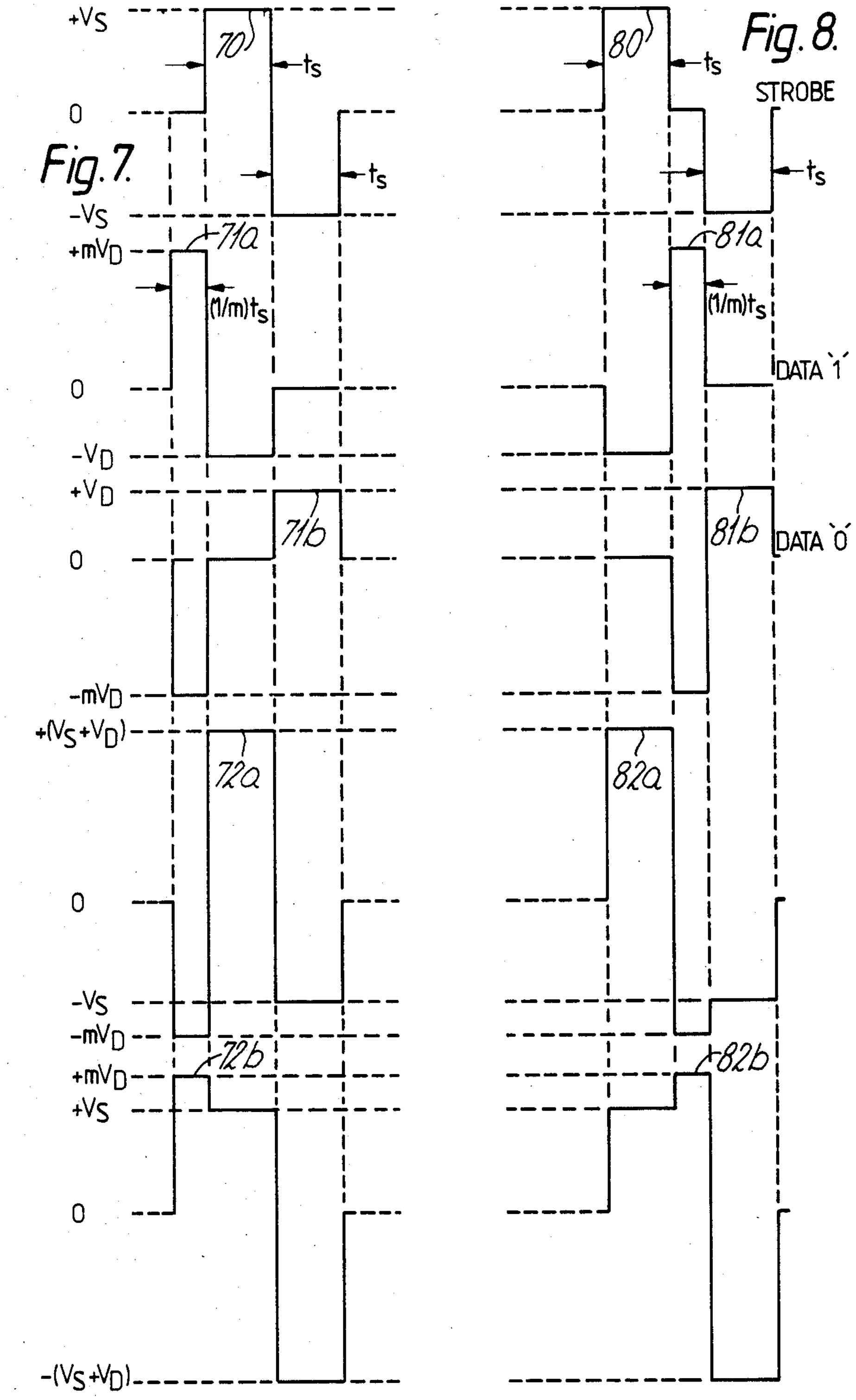

The introduction of the zero voltage steps of FIGS. 5 and 6 increases the line address time beyond $3t_S$. A reduction in line address time is sometimes possible by one adoption of the expedient now to be described with reference to FIGS. 7 and 8. The strobe pulse waveforms of FIGS. 3 and 4 are modified by the shortening of the zero voltage portions of the strobe pulses 30 and 40 by a factor 'm' to give strobe pulses 70 and 80. The corresponding portions of the data pulse waveforms 31a, 31b, 41a and 41b are similarly shortened while their magnitudes are increased in the same porportion so as to retain charge balance. The resulting asymmetric, but charge balanced, bipolar data '1' and data '0' waveforms are depicted at 71a, 71b, 81a and 81b. The resultant potentials developed across an addressed pixel are given by waveforms 72a, 72b, 82a and 82b respectively. The factor 'm' is typically not more than 3. The line address time is reduced by the use of these asymmetric waveforms from $3t_S$ to $(2+1/m)\ t_S$.

Figure 9:
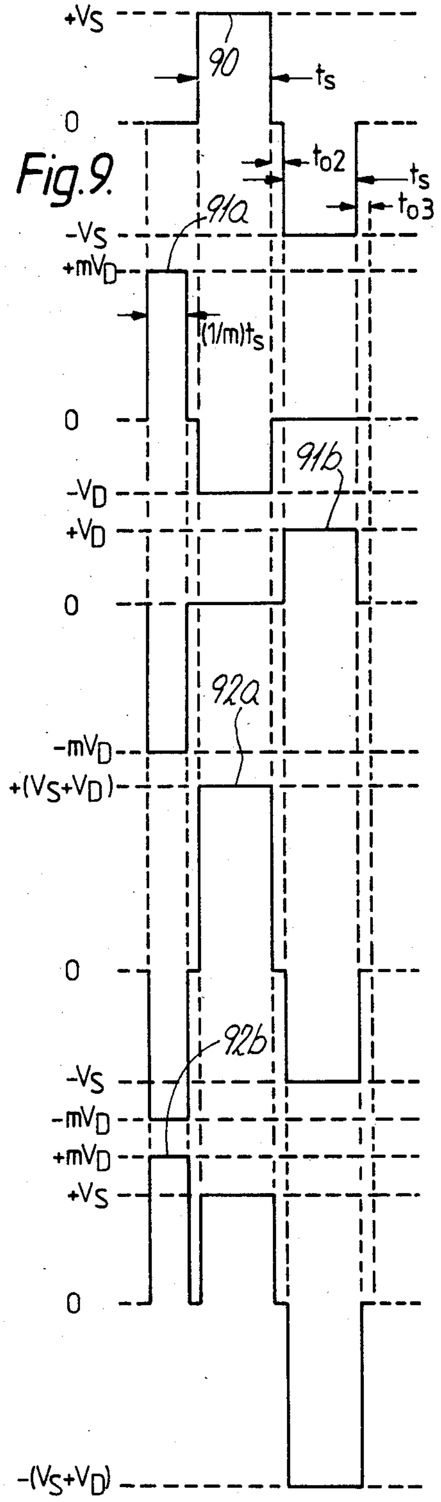
Figure 10:
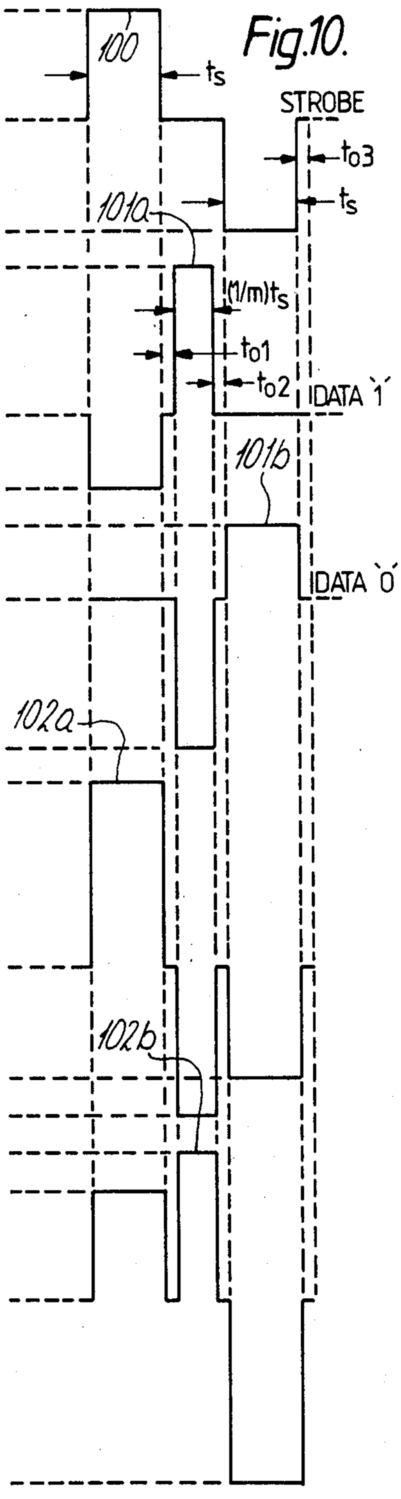

The use of these asymmetric waveforms may also be combined with the use of the zero voltage gaps described previously with particular reference to FIGS. 5 and 6. The resulting waveforms are depicted in FIGS. 9 and 10. in which the strobe pulse waveforms are depicted at 90 and 100, the data '1' pulse waveforms at 91a and 101a, the data '0' pulse waveforms at 91b and 101b, and the resultant potentials developed across an addressed pixel at 92a, 92b, 102a and 102b.

Figure 11:
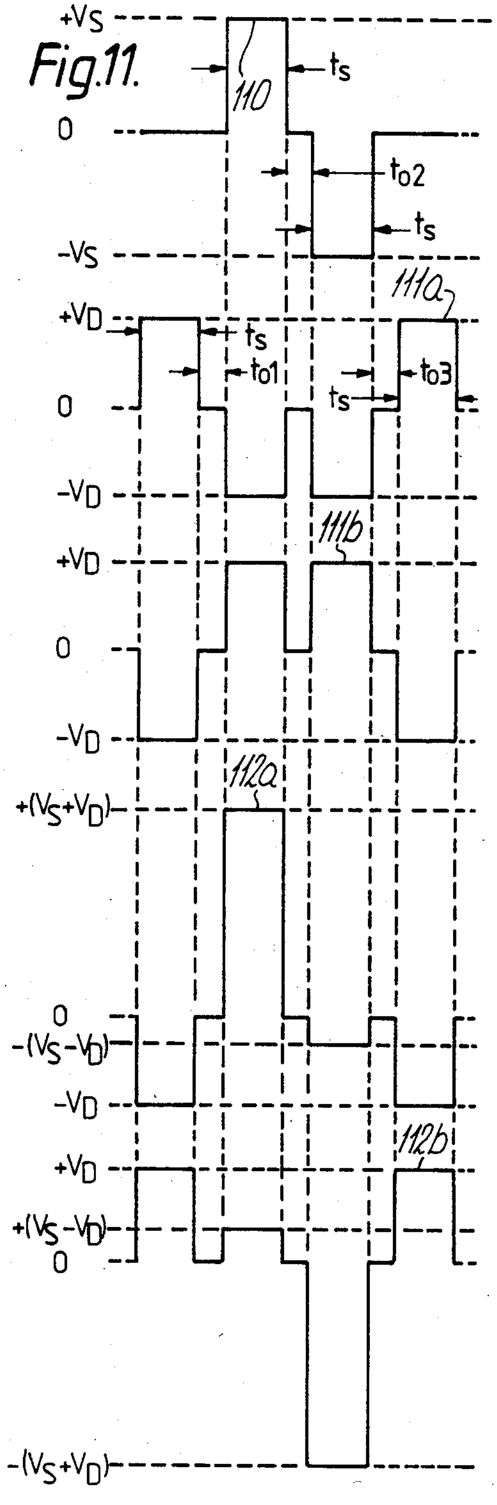
Figure 12:
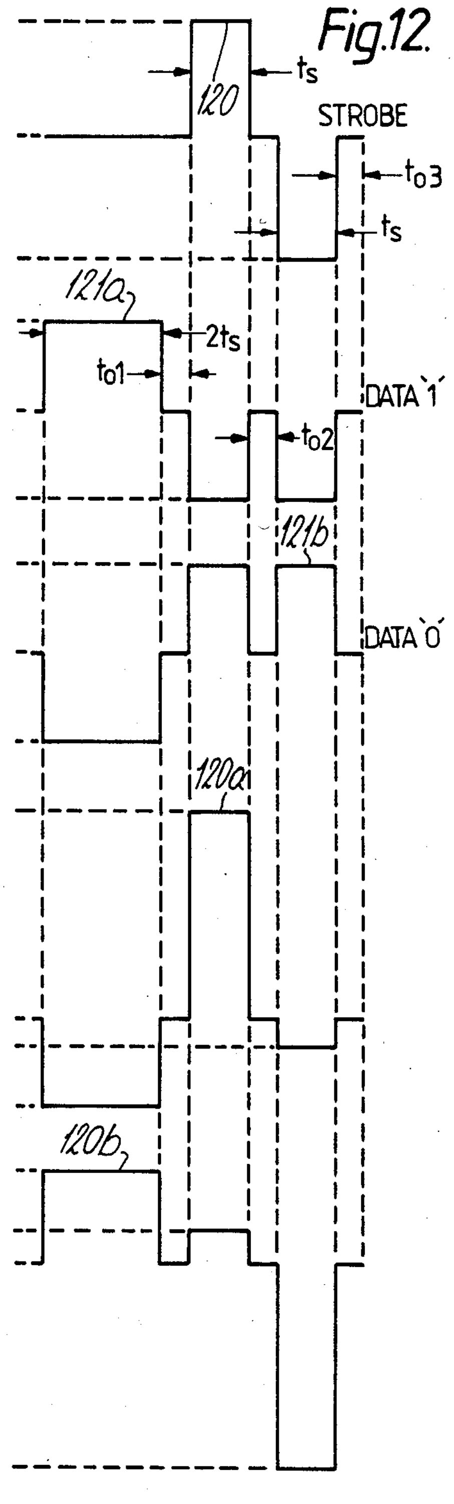

The waveforms of FIGS. 5 and 6 are distinguished from those of FIGS. 3 and 4 by the introduction of zero voltage steps $t_{01}$, $t_{02}$ and $t_{03}$ designed to prevent any switching stimulus from ever being immediately preceded by a reverse polarity stimulus or immediately followed by it, and thus to relax the switching criteria. A similar relaxation in the switching criteria for the waveforms of FIG. 2 is achieved by the introduction of similar zero voltage steps as depicted in FIG. 11. FIG. 12 shows a similar modification applied to the waveforms of FIG. 3 of the above-referenced commonly assigned co-pending U.S. application Ser. No. 647,567 filed on Sept. 6, 1984. In these Figures the strobe pulse waveforms are depicted respectively at 110 and 120, the data '1' waveforms at 111a and 121a, the data '0' waveforms at 111b and 121b, and the resultant potentials developed across an addressed pixel at 112a, 112b, 122a and 122b.

Figure 13:
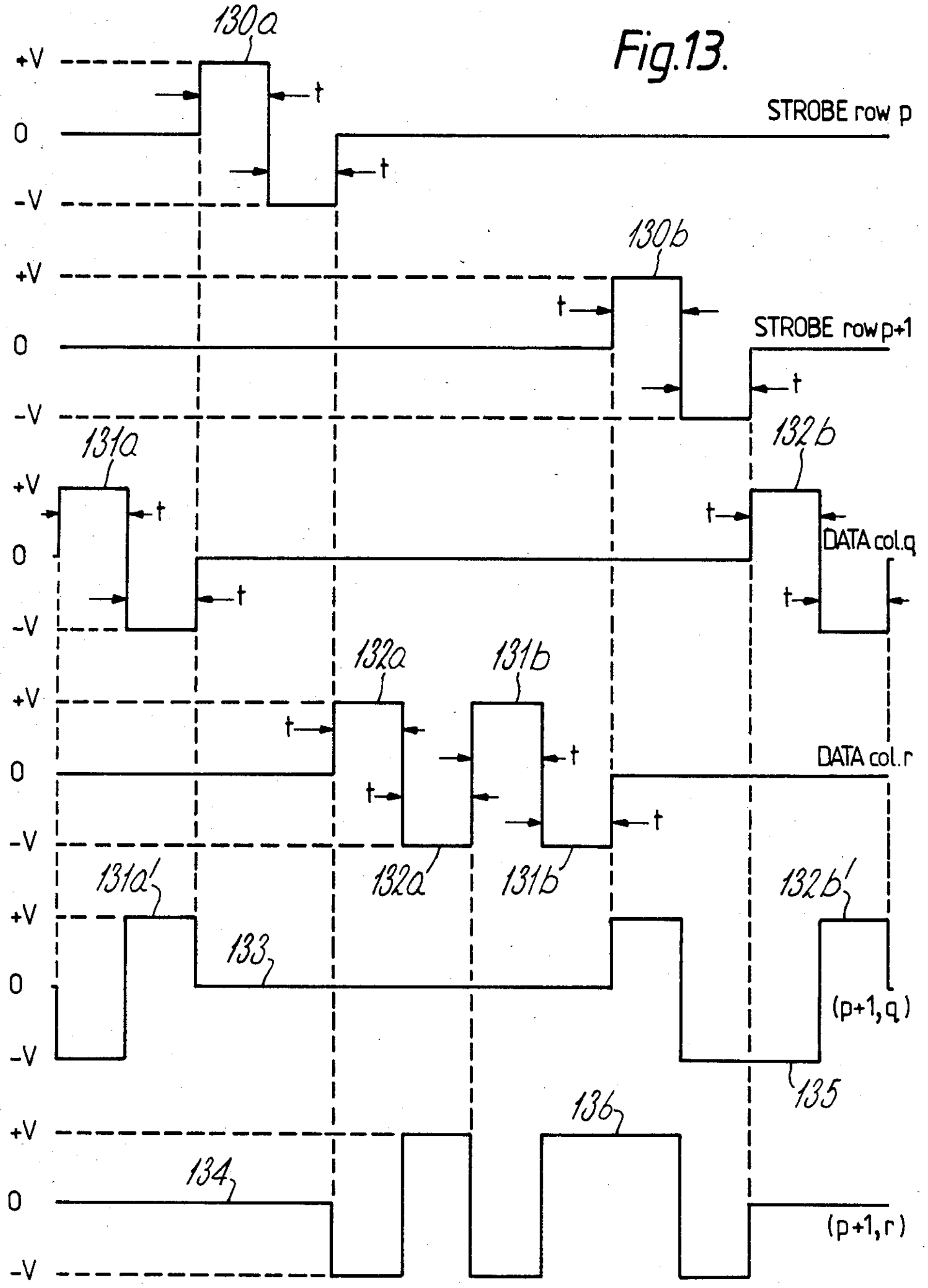

Attention will now be turned to FIG. 13 which depicts waveforms according to yet another preferred embodiment. Pairs of strobe, data '1' and data '0' waveforms are depicted respectively at 130a, 130b, 131a, 131b. 132a and 132b. As with the previous embodiments, so with this one, the data waveforms are applied in parallel to the electrode strips of one of the electrode layers 14, 15, while strobe pulses are applied serially to those of the other electrode layer. In this instance each of the three types of pulse waveform has the same profile. This waveform is balanced bipolar, and involves making positive-going voltage excursion to $+V$ for a duration 't' followed immediately by a negative-going voltage excursion to $-V$ for a further duration 't'. In order to address any given line of pixels the appropriate data pulses are arranged to bracket the application of the strobe pulse, with data '1' waveforms 131 immediately preceding the strobe pulse 130, and data '0' waveforms 132 immediately following the strobe pulse.

The values of 'V' and 't' are chosen so that a pulse of amplitude 'V' maintained for a duration 2t is sufficient to switch a pixel in the state determined by the direction in which that potential is applied, while a pulse of amplitude 'V' maintained for a duration of only 't' is insufficient for this purpose.

In FIG. 13 the strobe pulse waveforms for rows 'p' and 'p+1' are depicted respectively at 130a and 130b. The pixel (p,q) defined by the intersection of row 'p' with column 'q' is set into, or maintained in, the data '1' state by the co-operative action of the strobe pulse waveform 130a to row 'p', with the data '1' pulse waveform 131a applied to column '1' immediately prior to the application of that strobe pulse. Similarly the pixel (p,r) defined by the intersection of row 'p' with column 'r' is set into, or maintained in, the data '0' state by the co-operative action of the strobe pulse waveform 130a applied to row 'p' and the data '0' pulse waveform 132a applied to column 'r'. The minimum period elapsing between the end of one strobe pulse and the beginning of the next is 4t. Data pulse waveforms 131b and 132b co-operate with strobe pulse waveform 131b applied to row 'p+1' to set pixels (p+1, q) and (p+1, r) respectively into the data '1' and data '0' states (or, if they are already respectively in those states, to maintain them in those states).

The potentials developed across the liquid crystal layer at pixels (p+1, q) and (p+1, r) as a result of these waveforms are depicted respectively at 133 and 134. Remembering that the row and column voltages are applied to opposite sides of the liquid crystal layer, the data '1' pulse waveform 131*a* is inverted in the waveform trace 133 at 131*a'*. It has no switching effect because the positive and negative voltage excursions each last only for a duration 't'. In contrast to this, the data '0' pulse waveform 132*b* inverted at 132*b'* in waveform trace 133, provides in its first half a voltage excursion of the same polarity as that of the second half of the strobe pulse 130*b* that immediately precedes it. The result is that at 135 in waveform trace 133 pixel (p+1, q) is exposed to the voltage +V for a duration 2t, and this is sufficient to effect switching into the data '0' state. Similarly in trace 134 the inversion of the data '1' pulse 131*b* produces a positive going excursion which is followed immediately by the positive going excursion of the first half of strobe pulse 130*b*. The result is that at 136 in waveform trace 134 pixel (p+1, r) is exposed to the voltage +V for a duration 2t. This causes this pixel to switch into the data '1' state.

Comparing the waveforms of FIGS. 2 and 13 it is seen that the minimum line address time with the FIG. 2 waveforms is four times the minimum switching period, $t_S$, whereas with the FIG. 13 waveforms it is only three times the minimum switching period '2t'.

The strobe and data pulse waveforms of FIG. 13 produce a switching stimulus of 'V' maintained for a duration 2t. Inspection of the FIG. 13 waveforms show however that each switching stimulus is both immediately preceded by and immediately followed by reverse polarity stimuli. Under appropriate conditions, the magnitude of 'V' or of 't' or even of both 'V' and 't' can be reduced if this sort of reverse polarity stimulus can be eliminated. This is achieved with the waveforms of FIG. 14. These waveforms leave the same magnitude of reverse polarity stimulus as those of FIG. 13, but separate such stimuli from the switching stimuli by the introduction of zero voltage steps of duration $t_0$ between the positive-and negative-going excursions of the strobe pulses and of both significances of data pulse. Strobe pulse waveforms for rows 'p' and 'p+1' are depicted respectively at 140*a* and 140*b*. Data '1' pulse waveforms are depicted at 141*a* and 141*b* respectively for columns 'q' and 'r', while data '0' pulse waveforms are depicted at 142*a* and 142*b* respectively for columns 'r' and 'q'. The potentials developed across the liquid crystal layer at pixels (p+1, q) and (p+1, r) as a result of the waveforms are depicted respectively at 143 and 144. Typically the duration $t_0$ of each of these zero voltage steps is not more than 50% of the duration t of a single voltage excursion. The minimum line address time is seen to be $3(2t+t_0)$. Superficially this appears longer than the minimum line address time of 6t achieved with the waveforms of FIG. 13, but it must be remembered that the object of introducing the zero voltage steps was to ease switching, and so the value of 't' is not necessarily the same in the two instances.

Figure 14:
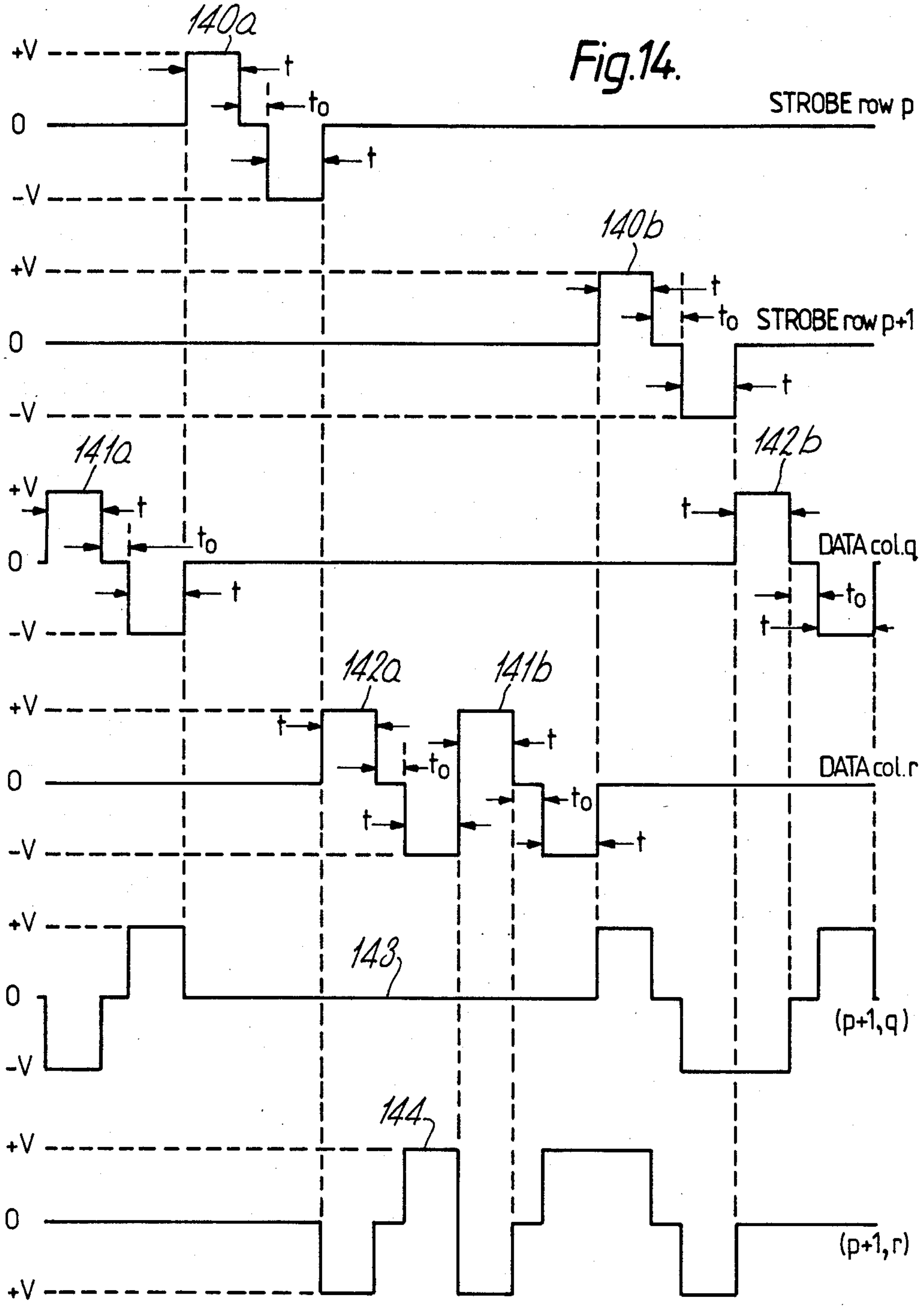
Figure 15:
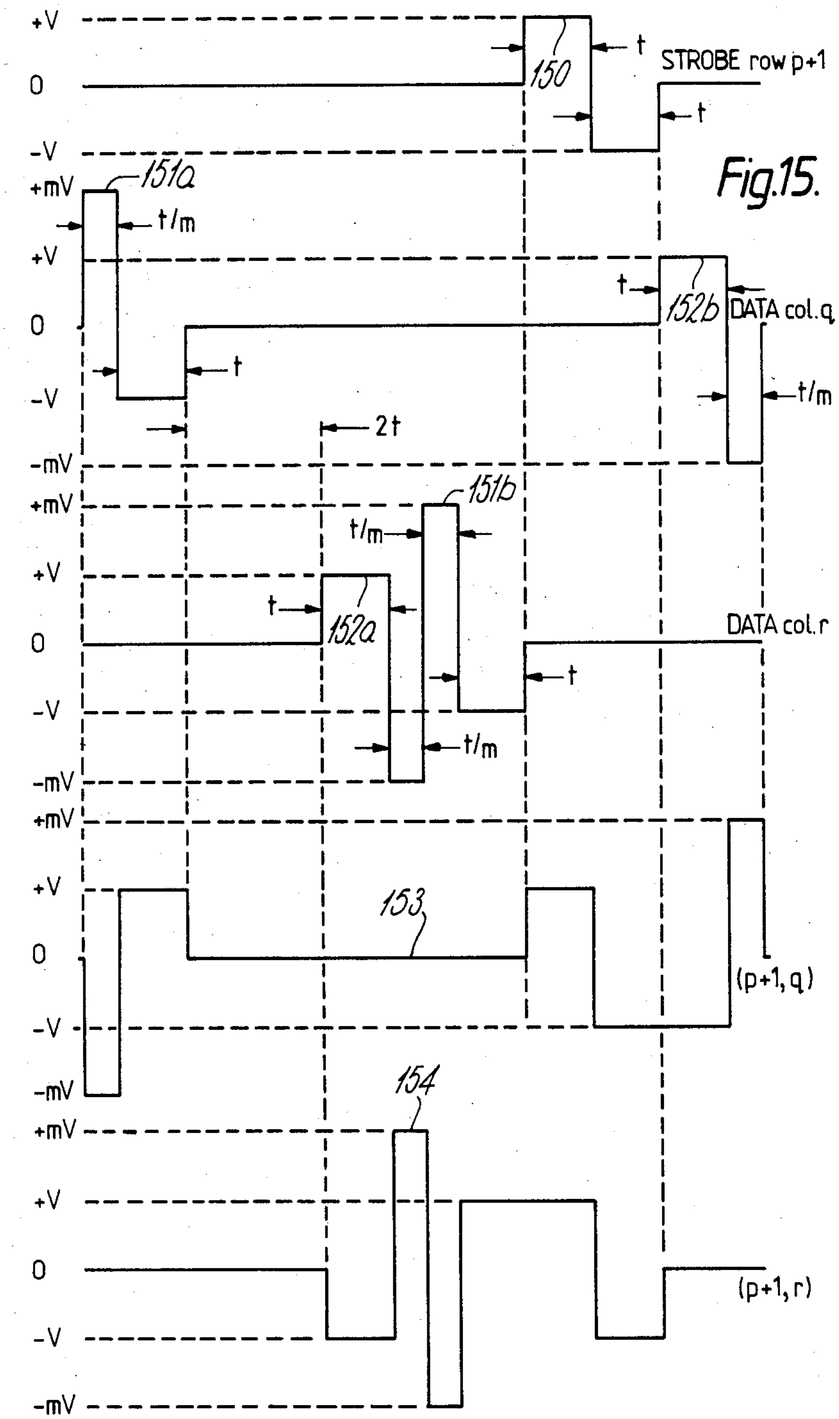

The strobe and data pulse waveforms of FIGS. 13 and 14 are composed of balanced bipolar pulses, and this is a necessary requirement. However, it is not necessary for the positive- and negative-going excursions of a data pulse to be of the same amplitude and duration. The waveforms of FIG. 15 are distinguished from those of FIG. 13 by using asymmetric data pulses. The positive-going excursion of a data '1' pulses. The negative-ging excursion of a data '0' pulse are 'm' times the amplitude and $1/m^{th}$ the duration of their oppositely directed voltage excursions, where 'm' is some factor greater than unity. The strobe pulse waveform for row 'p+1' is depicted at 150. Data '1' pulse waveforms are depicted at 151*a* and 151*b* respectively for columns 'q' and 'r', while data '0' pulse waveforms are depicted at 152*a* and 152*b* respectively for columns 'r' and 'q'. The potentials developed across the liquid crystal layer at pixels (p+1, q) and (p+1, r) as a result of the waveforms are depicted respectively at 153 and 154. The minimum line address time in this instance is seen to be $2t(2+1/m)$.

Figure 16:
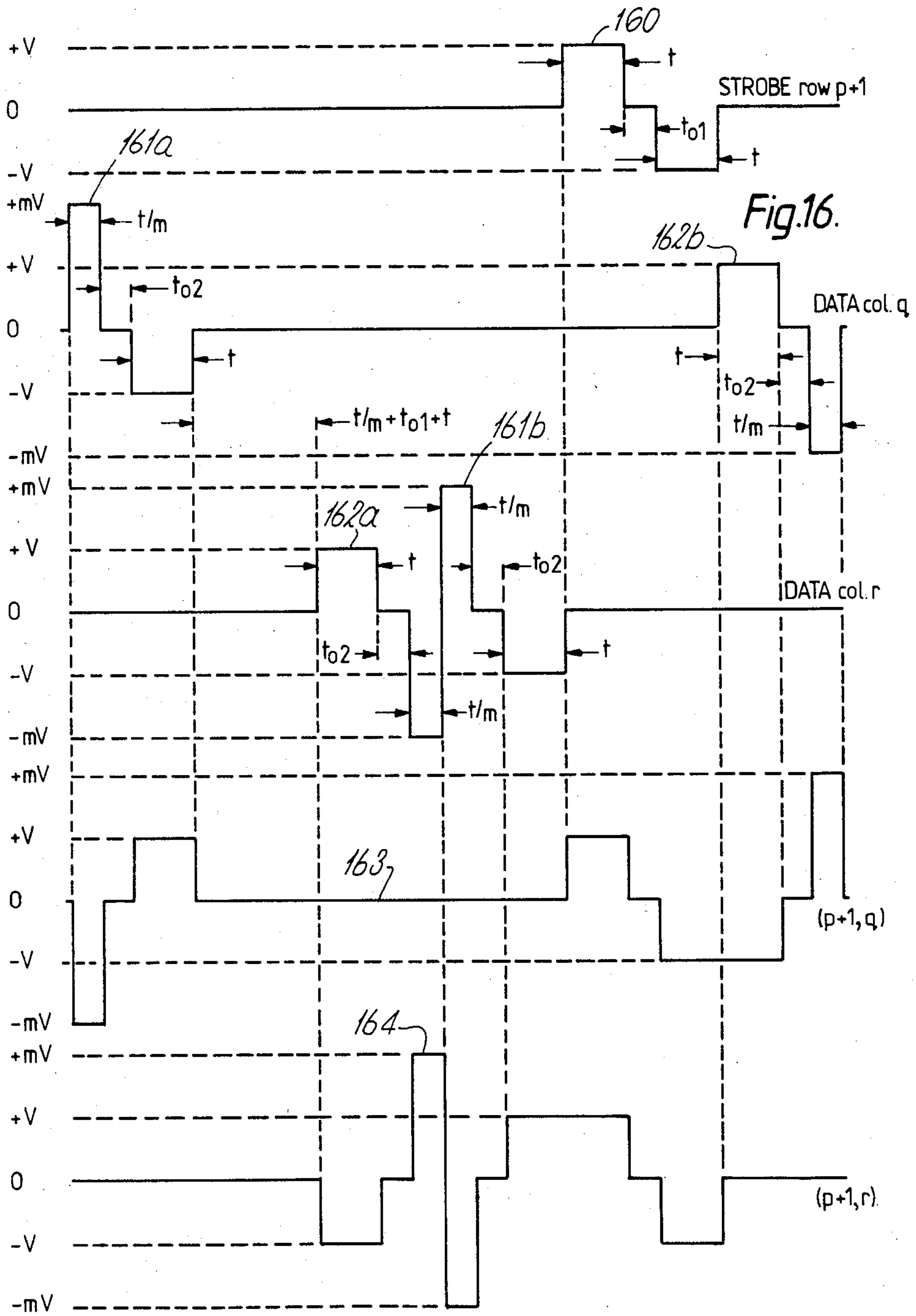

Waveforms 153 and 154 show that the reduction in minimum time address time achieved by the adoption of the waveforms of FIG. 15 produces reverse polarity stimuli immediately preceding or immediately following the switching stimulus that are stronger than those obtained with the waveforms of FIG. 13, albeit of shorter duration. The effect of these reverse polarity stimuli can be reduced by the insertion of zerovoltage steps into the waveforms after the manner previously described with the reference to FIG. 14. The result is the waveforms of FIG. 16. A zero voltage step of duration $t_{01}$ is inserted between the positive- and negative-going excursions of data pulses, while a similar zero voltage step of duration $t_{02}$ is inserted between those of both significances of data pulse. The durations $t_{01}$ and $t_{02}$ may be equal, but are not necessarily so. The strobe pulse waveform for row 'p+1' is depicted at 160. Data '1' pulse waveforms are depicted at 161*a* and 161*b* respectively for columns 'q' and 'r', while data '0' pulse waveforms are depicted respectively at 162*a* and 162*b* respectively for columns 'r' and 'q'. The potentials developed across the liquid crystal layer at pixels (p+1, q) and (p+1, r) as a result of the waveforms are depicted respectively at 163 and 164. The minimum line address time in this instance is seen to be $2t(2+1/m)+t_{01}+2t_{02}$.

Figure 17:
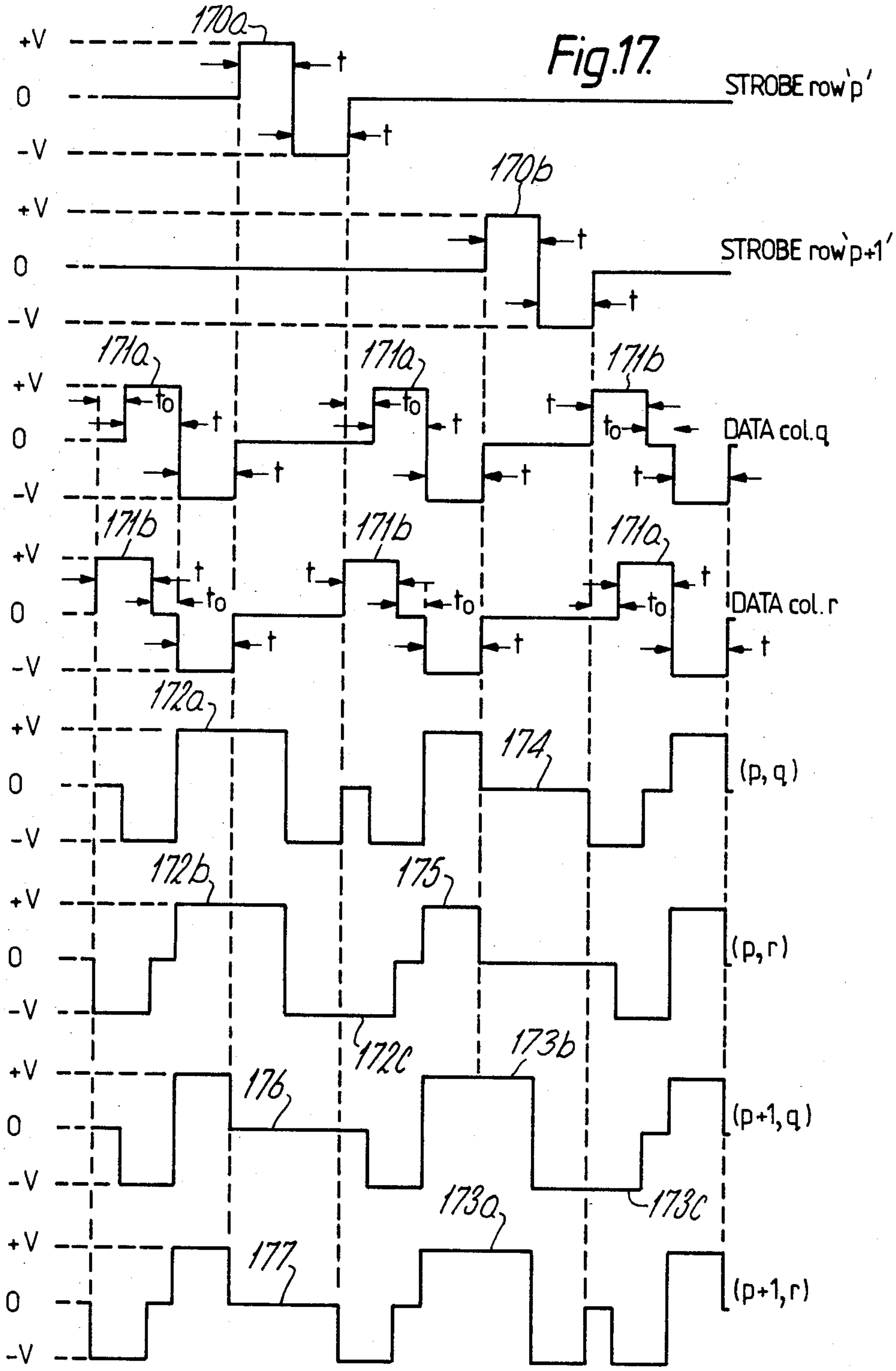

With the waveforms of FIGS. 13, 14, 15 and 16 the data pulses bracket each strobe pulse, but an individual data pulse is either entirely ahead of the strobe pulse or entirely after it, according to data significance. Attention is now turned to the waveforms of FIG. 17 in which each data pulse individually brackets a strobe pulse. The leading part of a data pulse, the part before a strobe pulse, co-operates with a strobe pulse to set the relevant pixel into the data '1' state, or maintain it in that state if it was already in the data '1' state. Then the trailing part of the data pulse leaves the pixel in the data '1' state if it is a data '1' pulse waveform, or resets it into the data '0' state if it is a data '0' pulse waveform. The trailing part of the data pulse waveform simultaneously forms the leading part of the data pulse waveform for the next strobe pulse.

Strobe pulse waveforms for row 'p' and 'p+1' are depicted respectively at 170*a* and 170*b*. These consist of a positive-going excursion to a voltage +V for a duration 't' which is followed immediately by a negative-going excursion for a further duration 't'. A data pulse waveform is formed in two halves each of which exists in two forms 171*a* and 171*b*. The half data pulse waveform 171*a* consists of a zero voltage section of duration $t_0$ followed by a positive-going excursion to +V for a duration 't', which is immediately followed by a negative-going excursion to −V for a further duration 't'. The half data pulse waveform 171*b* is like that of waveform 171*b* except that the zero voltage section now lies between the positive- and negative-going excursions instead of ahead of them. The interval between consecutive strobe pulses is equal to the duration of a half data pulse waveform 171*a* and 171*b*. The potentials developed across the liquid crystal layer at pixels (p, q), (p, r), (p+1, q) and (p+1, r) as a result of the waveforms are depicted respectively at 174, 175, 176 and 177.

As before, the values of 'V' and 't' are chosen so that a pulse of amplitude 'V' maintained for a duration 2t is sufficient to switch a pixel in the state determined by the direction in which that potential is applied, while a pulse of amplitude 'V' maintained for a duration of only 't' is insufficient for this purpose.

Pulse waveform 171*a* applied to column 'q' immediately before strobe pulse 170*a* therefore co-operates with the first half of that strobe pulse to produce at pixel (p,q) a voltage excursion 172*a* to +V lasting for a duration 2t. A similar effect is also obtained if pulse waveform 171*a* is replaced by pulse waveform 171*b*, as occurs for instance in the production of the voltage excursion 172*b* at pixel (p,r). In the case of pixel (p,q) the voltage excursion 172*a* is followed by a reverse polarity excursion to −V that is maintained for a duration of only 't', and therefore pixel (p,q), having been set into the data '1' state by voltage excursion 172*a*, remains set in the data '1' state. In the case of pixel (p,r), the voltage excursion 172*a* is followed by a reverse polarity voltage excursion 172*c* to −V that is maintained for a duration of 2t, and therefore in this instance the pixel (p,r), having first been set into the data '1' state by the voltage excursion 172*a*, is then immediately reset back into the data '0' state by voltage excursion 172*c*. Similarly the waveforms co-operate to set pixel (p+1,r) into the data '1' state by the voltage excursion 173*a*, whereas they co-operate to set pixel (p+1, r) first into the data '1' state by the voltage excursion 173*b*, and then immediately back into the data '0' state by the voltage excursion 173*c*.

From examination of these waveforms it is seen that it is the form of a half data pulse waveform that immediately follows a strobe pulse that determines the data significance of the full data waveform at the pixel addressed by the coincidence of that waveform with the strobe pulse. Further it is seen that this data significance has itself no data significance in the addressing of the next row with the next strobe pulse, even though it does form part of the full data waveform used in the addressing of that next row.

Figure 18:
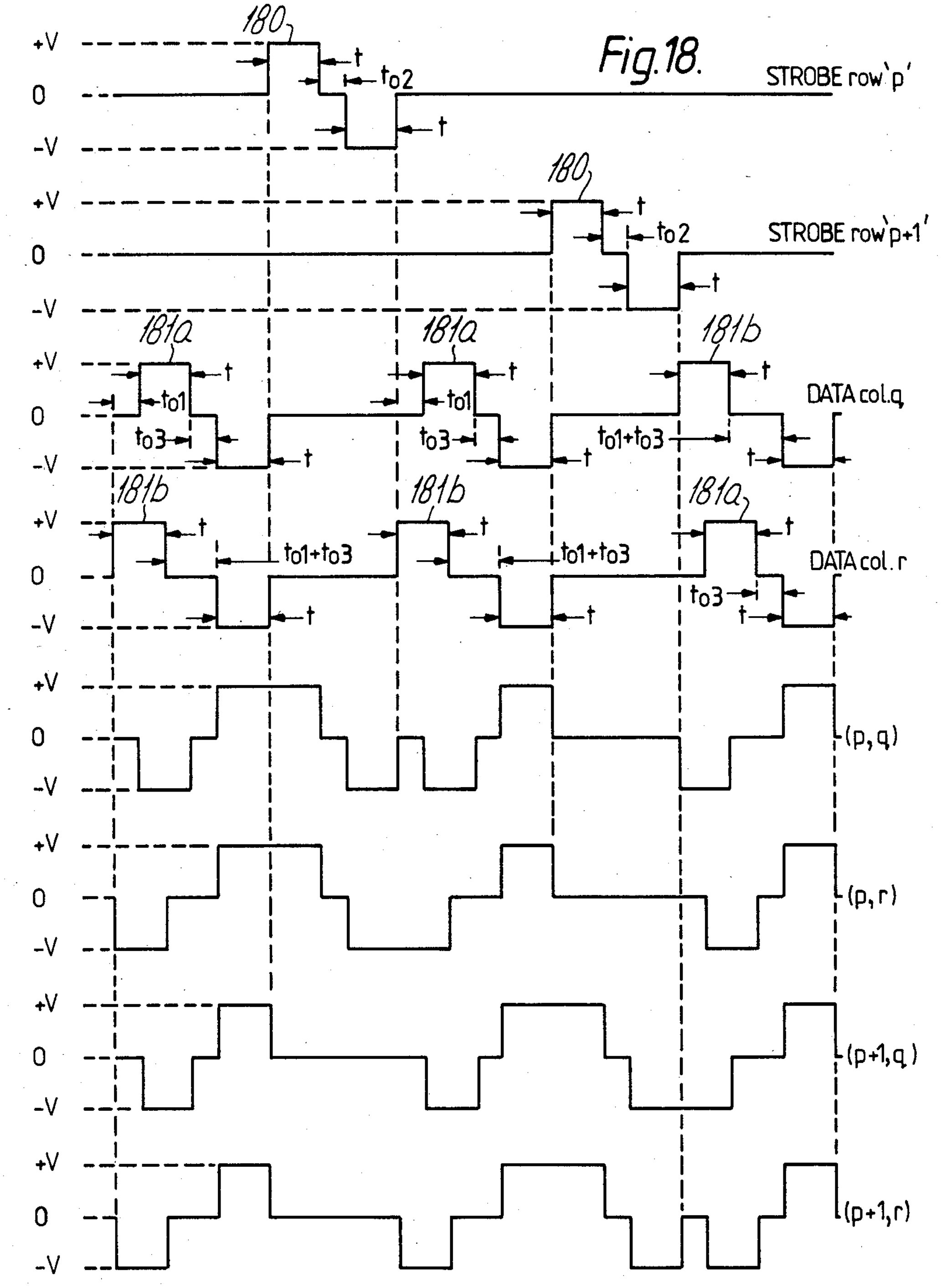

It may also be noted that voltage excursions 172*a* and 173*b* are immediately preceded by reverse polarity voltage excursions, and are also immediately followed by reverse polarity voltage excursions. On the other hand the other two voltage excursions that determine the final state of an address pixel, voltage excursions 172*c* and 173*c*, are immediately preceded by reverse polarity voltage excursions, but are not immediately followed by reverse polarity excursions. FIG. 18 shows how the waveforms of FIG. 17 may be modified by the lengthening of the strobe and data pulse waveforms by the inclusion of additional zero voltage sections so as to prevent reverse polarity excursion from immediately preceding or immediately following any switching stimulus.

Strobe pulse waveforms 180 consist of positive- and negative-going voltage excursions, respectively to +V and −V, each of duration 't' which are seperated by a zero voltage section of duration $t_{02}$. A half data pulse waveform 181*a* consists of a zero voltage section of duration $t_{01}$ immediately followed by positive- and negative-going excursions, respectively to +V and −V, each of duration 't', which are separated by a zero voltage section of duration $t_{03}$. A half data pulse waveform 181*b* consists of positive- and negative-going voltage excursions, respectively to +V and −V, each of duration 't' which are separated by a zero voltage section of duration $(t_{01}+t_{03})$. Consecutive strobe pulse are separated in time by the duration of a half data pulse waveform 181*a* or 181*b*. The potentials developed across the liquid crystal layer at pixels (p.q.), (p.r), (p+1,q) and (p+1,r) as a result of the waveforms are depicted respectively at 184, 185, 186 and 187. The waveforms leave these pixels respectively in data states '1', '0', '0' and '1'.

Although the present invention has thus been described with particular reference to one or more presently preferred embodiments, doubtless other embodiments will be apparent to the skilled artisan without departing from the spirit and intent of the present invention. Accordingly, the invention should be deemed to encompass all possible embodiments falling within the scope of the appended claims, as well as any equivilent thereof.

We claim:

1. A method of addressing a matrix-array type liquid crystal cell with a ferroelectric liquid crystal layer whose pixels are defined by the areas of overlap between the members of a first set of electrodes on one side of the liquid crystal layer and the members of a second set on the other side of the layer, each such pixel being capable of being switched between first and second states respectively by the co-operation of a strobe pulse with a data pulse of a first data significance and by the co-operation of a strobe pulse with a data pulse of a second data significance, in which method (a) the cell is addressed on a line-by-line basis by applying strobe pulses serially to the members of said first set of electrodes while data pulses are applied in parallel to the members of said second set of electrodes, (b) the waveforms of said strobe and data pulses are both balanced and bipolar, and (c) the addressing of any given pixel includes a zero voltage portion within each said bipolar strobe pulse.

2. A method as claimed in claim 1, in which (d) said strobe and data pulse waveforms each include a zero voltage portion, a positive-going voltage excursion and a negative-going voltage excursion, and (e) wherein the waveforms are such that when a particular one of said strobe pulses is synchronized to co-operate with a particular one of said data pulses of said first data significance, the strobe pulse positive-going excursion coincides with the negative-going excursion of the data pulse while the negative-going excursion of the strobe pulse coincides with the zero voltage portion of the data pulse, and such that when said particular one of said strobe pulses is synchronized to co-operate with a different particular one of said data pulses of said second data significance the strobe pulse negative-going excursion coincides with the positive-going excursion of the data pulse while the positive-going excursion of the strobe pulse coincides with the zero voltage portion of the data pulse.

3. A method as claimed in claim 2, wherein the positive- and negative-going voltage excursions of a strobing pulse are separated by its zero voltage portion.

4. A method as claimed in claim 2, wherein the strobe and data pulse waveforms are such that when a strobe pulse is synchronized with a data pulse of either data significance there are zero voltage dwell times for each waveform that precede and follow each voltage excursion of the strobe and data pulse waveforms.

5. A method as claimed in claim 2 wherein the positive- and negative-going voltage excursions of each balanced bipolar data pulse are asymmetric, the excursion of one polarity having 'm' times the amplitude of the other and $1/m^{th}$ the duration, m being a constant other than 1.

6. A method as claimed in claim 1, wherein the positive and negative going portions of each balanced bipolar data pulse are asymmetric, one part having m times the amplitude of the other and $1/m^{th}$ the duration, m being a constant other than 1.

7. A method as claimed in claim 1, wherein in the addressing of any given pixel by the co-operative action of a strobe pulse and a data pulse the positive- and negative-going excursions of the data pulse entirely precede the strobe pulse, or entirely follow it, according to data significance.

8. A method as claimed in claim 7, wherein the data pulses of both said first and said second data significances and the strobing pulses all incorporate zero voltage steps between their positive-and negative-going voltage excursions.

9. A method as claimed in claim 7, wherein the data pulses of both said first and second data significances and the strobing pulses all make positive-going excursions to the same common voltage +V and negative-going excursions to the same common voltage −V.

10. A method as claimed in claim 7, wherein the positive- and negative-going excursions of each data pulse are asymmetric, one part having 'm' times the amplitude of the other and $1/m^{th}$ the duration, m being a constant other than 1.

11. A method as claimed in claim 1 wherein, (d) the addressing of any given pixel by the co-operative action of a strobe pulse and a data pulse, and the data pulse is composed of two halves one of which immediately precedes the strobe pulse and the other of which immediately follows the strobe pulse, and (e) wherein the half which immediately follows the strobe pulse also functions as the half which immediately precedes the strobing pulse of the next line to be strobed.

12. A method as claimed in claim 11, wherein the data pulses of both said first and said second data significances and the strobing pulses all incorporate zero voltage steps between their positive-and negative-going voltage excursions.

* * * * *